United States Patent
Ben-Nun et al.

(10) Patent No.: US 8,817,614 B1
(45) Date of Patent: Aug. 26, 2014

(54) POLICY ENFORCER HAVING LOAD BALANCING CAPABILITIES

(75) Inventors: Michael Ben-Nun, Ramat Hasharon (IL); Nery Strasman, Ramat Gan (IL); Ariel Peltz, Tel Aviv (IL); Ofer Weill, Modi'in (IL)

(73) Assignee: Vasona Networks Inc., Santa Clara, CA (US)

( * ) Notice: Subject to any disclaimer, the term of this patent is extended or adjusted under 35 U.S.C. 154(b) by 377 days.

(21) Appl. No.: 13/305,751

(22) Filed: Nov. 29, 2011

Related U.S. Application Data

(63) Continuation-in-part of application No. 13/233,043, filed on Sep. 15, 2011.

(60) Provisional application No. 61/383,414, filed on Sep. 16, 2010.

(51) Int. Cl.
    *H04J 1/16* (2006.01)

(52) U.S. Cl.
    USPC .......................... 370/230; 370/231; 370/428

(58) Field of Classification Search
    CPC ................. H04J 2203/0073; H04J 2203/0071
    USPC .................. 370/252, 236, 389, 230, 231, 428
    See application file for complete search history.

(56) References Cited

U.S. PATENT DOCUMENTS

| | | | |
|---|---|---|---|
| 5,053,950 A * | 10/1991 | Naganuma et al. | 718/105 |
| 5,867,706 A * | 2/1999 | Martin et al. | 718/105 |
| 6,128,279 A * | 10/2000 | O'Neil et al. | 370/229 |
| 6,385,673 B1 | 5/2002 | DeMoney | |
| 6,697,378 B1 | 2/2004 | Patel | |
| 6,725,253 B1 * | 4/2004 | Okano et al. | 709/203 |
| 7,996,842 B2 * | 8/2011 | Savit | 718/104 |
| 8,089,899 B2 * | 1/2012 | Lund et al. | 370/252 |
| 8,117,641 B2 * | 2/2012 | Morimura et al. | 726/1 |
| 8,205,004 B1 | 6/2012 | Kaufman et al. | |
| 8,504,721 B2 * | 8/2013 | Hsu et al. | 709/245 |
| 8,522,017 B2 * | 8/2013 | Ramankutty | 713/168 |
| 2003/0067872 A1 | 4/2003 | Harrell et al. | |
| 2004/0162901 A1 * | 8/2004 | Mangipudi et al. | 709/225 |
| 2004/0203825 A1 | 10/2004 | Daniel et al. | |
| 2005/0114538 A1 | 5/2005 | Rose | |
| 2005/0148314 A1 | 7/2005 | Taglienti et al. | |
| 2005/0204046 A1 | 9/2005 | Watanabe | |
| 2008/0212480 A1 | 9/2008 | Shimonishi | |
| 2009/0327079 A1 | 12/2009 | Parker et al. | |
| 2010/0034089 A1 | 2/2010 | Kovvali et al. | |
| 2010/0074275 A1 | 3/2010 | Sahai | |
| 2010/0131671 A1 | 5/2010 | Kohli et al. | |
| 2010/0151899 A1 | 6/2010 | Lekutai | |

(Continued)

*Primary Examiner* — Ricky Ngo
*Assistant Examiner* — Dewanda Samuel
(74) *Attorney, Agent, or Firm* — Oren Reches

(57) ABSTRACT

A method, a computer readable medium and a policy enforcer, the policy enforcer may include: multiple pairs of interfaces; multiple data blades; a switch; at least one load balancing circuit; wherein each pair of interfaces is located along a path between a RAN and an external network through which information packets should have propagated at an absence of the policy enforcer; wherein the at least one load balancing circuit is arranged to select, for each information packet, a selected policy enforcing processor; wherein the at least one load balancing circuit is arranged to select is arranged to send each information packet over the switch to a selected policy enforcing processor; wherein each selected policy enforcing processor is arranged to perform a policy enforcing operation on each information packet associated with the selected policy enforcing processor.

28 Claims, 16 Drawing Sheets

(56) References Cited

U.S. PATENT DOCUMENTS

| | | |
|---|---|---|
| 2010/0195602 A1 | 8/2010 | Kovvali et al. |
| 2011/0032898 A1 | 2/2011 | Kazmi et al. |
| 2011/0082924 A1 | 4/2011 | Gopalakrishnan |
| 2011/0145726 A1 | 6/2011 | Wei et al. |
| 2011/0197239 A1 | 8/2011 | Schlack |
| 2012/0039175 A1* | 2/2012 | Sridhar et al. ............... 370/236 |
| 2012/0039191 A1 | 2/2012 | Foster et al. |
| 2012/0052866 A1 | 3/2012 | Froehlich et al. |
| 2012/0087260 A1 | 4/2012 | Devarapalli et al. |
| 2013/0016620 A1 | 1/2013 | Den Hartog et al. |
| 2013/0163428 A1 | 6/2013 | Lee et al. |

* cited by examiner ated Sep. 15, 2011, which in

POLICY ENFORCER HAVING LOAD BALANCING CAPABILITIES

RELATED APPLICATIONS

This application is a continuation in part of U.S. patent application Ser. No. 13/233,043 filed Sep. 15, 2011, which in turn is claims priority from provisional patent filing date Sep. 16, 2010, Ser. No. 61/383,414, both being incorporated herein by reference.

BACKGROUND OF THE INVENTION

Third Generation (3G) Wireless Networks 3G wireless networks may interface with external networks such as the internet. Third generation (3G) wireless networks have a General Packet Radio Service (GPRS) core network that facilitates the transmission of Internet Protocol (IP) packets between the 3G wireless network and the internet. The GPRS core network may use a GPRS tunneling protocol that allows users of the 3G wireless network to be coupled to external packet switched networks (such as the Internet) while moving from one location to the other. The GPRS may include various components such as the Service GPRS Support Node (SGSN) and Gateway GPRS Support node (GGSN). The SGSN can interface with a Radio Network Controller (RNC).

The functionality of the different 3G wireless network components is known in the art and defined in various known standards. One non-limiting explanation relating to the SGSN, the RNC and the GGSN can be found in www.wikipedia.org.

Gateway GPRS Support Node (GGSN)—The Gateway GPRS Support Node (GGSN) is a main component of the GPRS network. The GGSN is responsible for the interworking between the GPRS network and external packet switched networks, like the Internet and X.25 networks. From an external network's point of view, the GGSN is a router to a sub-network, because the GGSN 'hides' the GPRS infrastructure from the external packet switched network. The GGSN may perform a network address translation (NAT) process which may corrupt address information about various entities of the RAN (or those which are coupled to the RAN) that participate in this exchange of information.

When the GGSN receives data addressed to a specific user, it checks if the user is active. If it is, the GGSN forwards the data to the SGSN serving the mobile user, but if the mobile user is inactive, the data is discarded. On the other hand, mobile-originated packets are routed to the right network by the GGSN. The GGSN is the anchor point that enables the mobility of the user terminal in the GPRS/UMTS networks. In essence, it carries out the role in GPRS equivalent to the Home Agent in Mobile IP. It maintains routing necessary to tunnel the Protocol Data Units (PDUs) to the SGSN that service a particular MS (Mobile Station).

The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the GSM address of the destination user. The readdressed packets are sent to the responsible SGSN. For this purpose, the GGSN stores the current SGSN address of the user and his or her profile in its location register. The GGSN is responsible for IP address assignment and is the default router for the coupled user equipment (UE). The GGSN also performs authentication and charging functions. Other functions include subscriber screening, IP Pool management and address mapping, QoS and PDP context enforcement. With LTE scenario the GGSN functionality moves to SAE gateway (with SGSN functionality working in MME).

Serving GPRS Support Node (SGSN)—a Serving GPRS Support Node (SGSN) is responsible for the delivery of data packets from and to the mobile stations within its geographical service area. Its tasks include packet routing and transfer, mobility management (attach/detach and location management), logical link management, and authentication and charging functions. The location register of the SGSN stores location information (e.g., current cell, current VLR) and user profiles (e.g., IMSI, address or addresses) used in the packet data network) of all GPRS users registered with this SGSN components.

Radio Network Controller (RNC)—the RNC is a governing element in the UMTS radio access network (UTRAN) and is responsible for controlling the Node Bs that are coupled to it. The RNC carries out radio resource management, some of the mobility management functions and is the point where encryption is done before user data is sent to and from the mobile. The RNC connects to the Circuit Switched Core Network through Media Gateway (MGW) and to the SGSN (Serving GPRS Support Node) in the Packet Switched Core Network. The logical connections between the network elements are known as interfaces.

The interface between the RNC and the Circuit Switched Core Network (CS-CN) is called Iu-CS and between the RNC and the Packet Switched Core Network is called IuPS. Other interfaces include Iub (between the RNC and the Node B) and Iur (between RNCs in the same network). Iu interfaces carry user traffic (such as voice or data) as well as control information Iur interface is mainly needed for soft handovers involving 2 RNCs though not required as the absence of Iur will cause these handovers to become hard handovers . . . ub, Iu and Iur protocols all carry both user data and signaling (that is, control plane).

Signaling protocol responsible for the control of the Node B by the RNC is called NBAP (Node-B Application Part). NBAP is subdivided into Common and Dedicated NBAP (C-NBAP and D-NBAP), where Common NBAP controls overall Node B functionality and Dedicated NBAP controls separate cells or sectors of the Node B. NBAP is carried over Iub. In order for NBAP to handle common and dedicated procedures, it is divided into: NodeB Control Port (NCP) which handles common NBAP procedures and Communication Control Port (CCP) which handles dedicated NBAP procedures. Control plane protocol for the transport layer is called ALCAP (Access Link Control Application Protocol).

Basic functionality of ALCAP is multiplexing of different users onto one AAL2 transmission path using channel IDs (CIDs). ALCAP is carried over Iub and Iu-CS interfaces. Signaling protocol responsible for communication between RNC and the core network is called RANAP (Radio Access Network Application Part), and is carried over Iu interface. Signaling protocol responsible for communications between RNCs is called RNSAP (Radio Network Subsystem Application Part) and is carried on the Iur interface.

Forth Generation (4G) Wireless Networks 4G networks can include a RAN that in turn may include components such as the enhanced Node B (eNodeB) that is the hardware that is coupled to the mobile phone network that communicates directly with mobile handsets.

4G networks can have a System Architecture Evolution (SAE) architecture. The SAE has a flat, all-IP architecture with separation of control plane and user plane traffic (www.wikipedia.org). The main component of the SAE architecture is the Evolved Core network (EPC), also known as SAE Core. The EPC will serve as equivalent of GPRS networks (via the Mobility Management Entity, Serving Gateway and PDN Gateway subcomponents).

FIG. 1 illustrates a prior art 4G network that is coupled to the Internet 230 and to a user equipment (UE) 210. It is noted that multiple UEs are coupled to the 4G network and are arranged in cells. The prior art 4G wireless network includes eNodeB 212, ePDG (Evolved Packet Data Gateway) 216, ANDSF (Access Network Discovery and Selection Function) 214, MME (Mobility Management Entity) 218, SGW (Serving Gateway) 220, HSS (Home Subscriber Server) 222 and PGW (PDN Gateway) 224.

FIG. 1 illustrates UE 210 as being coupled to eNodeB 212 and to ePDG 216, eNodeB 212 and ePDG 216 as being coupled to SGW 220. PGW 224 as being coupled between SGW 220 and the Internet 230, and MME 218 as being coupled between HSS 222 and eNodeB 212.

MME 218 is the key control-node for the LTE access-network. It is responsible for idle mode UE (User Equipment) tracking and paging procedure including retransmissions. It is involved in the bearer activation/deactivation process and is also responsible for choosing the SGW 220 for a UE at the initial attach and at time of intra-LTE handover involving Core Network (CN) node relocation. It is responsible for authenticating the user (by interacting with the HSS).

The Non Access Stratum (NAS) signaling terminates at the MME 218 and it is also responsible for generation and allocation of temporary identities to UEs. It checks the authorization of the UE to camp on the service provider's Public Land Mobile Network (PLMN) and enforces UE roaming restrictions. The MME 218 is the termination point in the network for ciphering/integrity protection for NAS signaling and handles the security key management. Lawful interception of signaling is also supported by the MME 218. The MME 218 also provides the control plane function for mobility between LTE and 2G/3G access networks with the S3 interface terminating at the MME 218 from the SGSN. The MME 218 also terminates the S6a interface towards the home HSS 222 for roaming UEs.

SGW 220 routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW 224). For idle state UEs, the SGW 220 terminates the DL data path and triggers paging when DL data arrives for the UE. It manages and stores UE contexts, e.g. parameters of the IP bearer service, network internal routing information. It also performs replication of the user traffic in case of lawful interception.

PGW 224 provides connectivity from the UE to external packet switched networks by being the point of exit and entry of traffic for the UE. The PGW 224 can perform a NAT process that corrupts address information. A UE may have simultaneous connectivity with more than one PGW 224 for accessing multiple PDNs. The PGW 224 performs policy enforcement, packet filtering for each user, charging support, lawful Interception and packet screening. Another key role of the PGW 224 is to act as the anchor for mobility between 3GPP and non-3GPP technologies such as WiMAX and 3GPP2 (CDMA 1X and EvDO).

HSS 222 is a central database that contains user-related and subscription-related information. The functions of the HSS 222 include functionalities such as mobility management, call and session establishment support, user authentication and access authorization. The HSS is based on pre-Rel-4 Home Location Register (HLR) and Authentication Center (AuC).

ANDSF 214 provides information to the UE about connectivity to 3GPP and non-3GPP access networks (such as Wi-Fi). The purpose of the ANDSF 214 is to assist the UE to discover the access networks in their vicinity and to provide rules (policies) to prioritize and manage connections to these networks.

ePDG 216—the main function of the ePDG 216 is to secure the data transmission with a UE coupled to the EPC over an untrusted non-3GPP access. For this purpose, the ePDG 216 acts as a termination node of IPsec tunnels established with the UE.

Non Access Stratum (NAS) Protocols—The non-access stratum (NAS) protocols form the highest stratum of the control plane between the user equipment (UE) and MME. NAS protocols support the mobility of the UE and the session management procedures to establish and maintain IP connectivity between the UE and a PDN GW. They define the rules for a mapping between parameters during inter-system mobility with 3G networks. They also provide the NAS security by integrity protection and ciphering of NAS signaling messages. EPS provides the subscriber with a "ready-to-use" IP connectivity and an "always-on" experience by linking between mobility management and session management procedures during the UE attach procedure Complete NAS transactions consist of specific sequences of elementary procedures with EPS Mobility Management (EMM) and EPS Session Management (ESM) protocols.

The MME protocol stack consists of S1-MME stack to support S1-MME interface with eNodeB 212 and S11 stack to support S11 interface with Serving Gateway. MME 218 supports the S1 interface with eNodeB 212. The integrated S1 MME interface stack consists of IP, SCTP and S1AP.

SCTP (Stream Control Transmission Protocol) is a common transport protocol that uses the services of Internet Protocol (IP) to provide a reliable datagram delivery service to the adaptation modules, such as the S1AP. SCTP provides reliable and sequenced delivery on top of the existing IP framework. The main features provided by SCTP are (A) association setup: An association is a connection that is set up between two endpoints for data transfer, much like a TCP connection. A SCTP association can have multiple addresses at each end. (B) Reliable Data Delivery: Delivers sequenced data in a stream (Elimination of head-of-line blocking): SCTP ensures the sequenced delivery of data with multiple unidirectional streams, without blocking the chunks of data in other direction.

S1AP (S1 Application Part) is the signaling service between E-UTRAN and the Evolved Core network (EPC) that fulfills the S1 Interface functions such as SAE Bearer management functions, Initial context transfer function, Mobility functions for UE, Paging, Reset functionality, NAS signaling transport function, Error reporting, UE context release function, Status transfer. MME S11 Interface support MME supports S11 interface with Serving Gateway. The integrated S11 interface stack consists of IP, UDP and eGTP-C.

SGW (Serving Gateway) protocol includes: S11 control plane stack to support S11 interface with MME, S5/S8 control and data plane stacks to support S5/S8 interface with PGW, S1 data plane stack to support S1 user plane interface with eNodeB, and S4 data plane stack to support S4 user plane interface between RNC of UMTS and SGW of eNodeB.

SGW supports S11 interface with MME and S5/S8 interface with PGW. The integrated control plane stack for these interfaces consists of IP, UDP and eGTP-C.

SGW supports the S1-U interface with eNodeB and S5/S8 data plane interface with PGW. The integrated data plane stack for these interfaces consists of IP, UDP, eGTP-U.

PGW (Packet Data Network Gateway) protocols include S5/S8 control and data plane stacks to support S5/S8 interface with SGW. PGW supports S5/S8 interface with Serving Gateway. The integrated control plane stack for the S5/S8 interfaces consists of IP, UDP, eGTP-C. The integrated data plane stack for the S5/S8 interface consists of IP, UDP, eGTP-U.

There is a growing need to perform policy enforcement on packets that propagate across these networks.

SUMMARY OF THE INVENTION

According to an embodiment of the invention a method for load balancing is provided. The method may include receiving, at a first input interface of a policy enforcer, a plurality of information packets that are associated with a plurality of user devices; wherein at an absence of the policy enforcer the plurality of information packets should have propagated along a first path between a radio access network (RAN) and an external network; selecting, for each information packet, a selected policy enforcing processor out of multiple policy enforcing processors that may belong to different data blades of the policy enforcer, wherein the selecting is responsive to an allocation of policy enforcing processors to user devices and to the user device associated with the information packet; sending each information packet to a selected policy enforcing processor associated with the information packet; performing, on each information packet, a policy enforcement operation by the selected policy enforcing processor associated with the information packet, to provide a policy enforced information packet; directing policy enforced information packets towards a first output interface of the policy enforcer, the first input interface corresponds to the first path; and outputting the policy enforced information packets from the first output interface of the policy enforcer.

The method may include receiving, by a control blade of the policy enforcer, control metadata that is indicative of at least one control plane message that was exchanged between a radio access network (RAN) and a core network; generating RAN status information based on the control metadata; and distributing the RAN status information to the different data blades of the policy enforcer.

The method may include performing, on each information packet, the policy enforcement operation in response to the RAN status information.

The method may include tracking a state of the control blade of the policy enforcer and switching between the control blade and a backup control blade if the state of the control blade is inactive.

The method may include checking a functionality of the data blades of the policy enforcer and matching the allocation of policy enforcing processors to the functionality of the data blades.

The first input interface and the first output interface may belong to a first data blade of the policy enforcer. The method may include sending each information packet that is associated with a selected policy enforcing processor that may belong s to another data blade of the policy enforcer to the other data blade over a switch of the policy enforcer; and sending each policy enforced information packet from the other data blade to the first data blade.

The first input interface and the first output interface may belong to an interfacing blade of the policy enforcer. The method may include sending, over a switch, each information packet that is associated with a selected policy enforcing processor to a data blade of the policy enforcer that comprises the selected policy enforcing processor; and sending each policy enforced information packet from a data blade and over the switch to the interfacing blade.

The method may include allocating a single policy enforcing processor to all information packets associated with a single cell of a radio access network (RAN).

The method may include selecting of the selected policy enforcing processor by a load balancing blade of the policy enforcer that does not have a policy enforcing processor.

Further embodiments of the invention include a computer readable medium that is non-transitory and may store instructions for performing above described methods and any steps thereof, including any combinations of same.

For example, the computer readable medium may store instructions for execution by one or more processors or similar devices, which instructions, when executed, result in, cause or facilitate receiving, at a first input interface of a policy enforcer, a plurality of information packets that are associated with a plurality of user devices; wherein at an absence of the policy enforcer the plurality of information packets should have propagated along a first path between a radio access network (RAN) and an external network; selecting, for each information packet, a selected policy enforcing processor out of multiple policy enforcing processors that belong to different data blades of the policy enforcer, wherein the selecting is responsive to an allocation of policy enforcing processors to user devices and to the user device associated with the information packet; sending each information packet to a selected policy enforcing processor associated with the information packet; performing, on each information packet, a policy enforcement operation by the selected policy enforcing processor associated with the information packet, to provide a policy enforced information packet; directing policy enforced information packets towards a first output interface of the policy enforcer, the first input interface corresponds to the first path; and outputting the policy enforced information packets from the first output interface of the policy enforcer.

Additional embodiments of the invention include a policy enforcer arranged to execute any or all of the methods described above, including any stages and any combinations of same.

For example, the policy enforcer may include multiple pairs of interfaces, each pair of interfaces comprises an input interface and a corresponding output interface; multiple data blades; a switch; at least one load balancing circuit; wherein each pair of interfaces is located along a path between a radio access network (RAN) and an external network through which information packets should have propagated at an absence of the policy enforcer; wherein each input interface is arranged to receive a plurality of information packets that are associated with a plurality of user devices; wherein the at least one load balancing circuit is arranged to select, for each information packet, a selected policy enforcing processor out of multiple policy enforcing processors that belong to the multiple data blades; wherein the at least one load balancing circuit is arranged to select in response to an allocation of policy enforcing processors to user devices and to a user device associated with each information packet; wherein the at least one load balancing circuit is arranged to send each information packet over the switch to the selected policy enforcing processor associated with the information packet; wherein each selected policy enforcing processor is arranged to perform a policy enforcing operation on each information packet associated with the selected policy enforcing processor, to provide a policy enforced information packet; wherein the switch is arranged to direct each policy enforced information packet to an output interface of the policy enforcer that belongs to a pair of interfaces that comprises the output interface and an input interface from which an information packet was received before being converted to the policy enforced information packet; and wherein each output interface is arranged to output each policy enforced information packet received by the output interface.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

Figure 1:
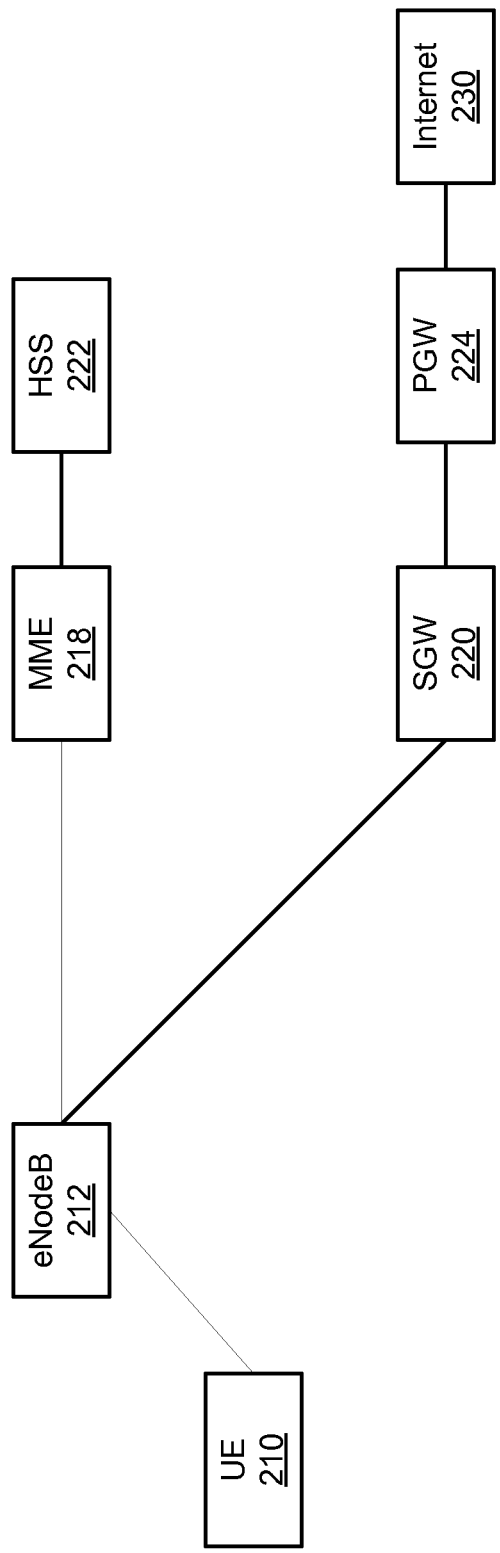
FIG. 1 illustrates a prior art 4G wireless network that is coupled to the Internet.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "modeling" can have its regular meaning and can be interpreted as including generation of information that represents a status of an entity. The status can reflect one or a plurality of parameters and their values. A model of an entity of a Radio Access Network can change over time.

The following abbreviations are being used:

| | |
|---|---|
| APN | Access Point Name |
| PE | policy enforcer |
| BSC | Base Station Controller |
| eNB | eNodeB |
| GGSN | Gateway GPRS Support Node |
| GPRS | General Packet Radio Services |
| GTP | GPRS Tunneling Protocol |
| IMEI | International Mobile station Equipment Identity |
| IMSI | International Mobile Subscriber Identity |
| ISDN | Integrated Services Digital Network |
| MME | Mobility Management Entity |
| MS | Mobile Station |
| MSISDN | MS international PSTN/ISDN number |
| NAS | Non-Access Stratum |
| NAT | Network address translator |
| NAT process | network address translation process |
| NSAPI | Network layer Service Access Point Identifier |
| PCF | Packet Control Function |
| PDN | Packet Data Network |
| PDSN | Packet Data Serving Node |
| PE | Policy enforcer. |
| P-GW PDN | Gateway |
| PSTN | Public Switched Telephone network |
| P-TMSI | Pseudo Temporary Mobile Subscriber Identity |
| QoS | Quality of Service |
| RAC | Routing Area Code |
| RAN | Radio Access Network |
| RANAP | Radio Access Network Application Part |
| RNC | Radio Network Controller |
| SGW | Serving Gateway |
| SGSN | Serving GPRS Support Node |
| TEID | Tunnel End Point Identifier |
| UE | User Equipment |

For simplicity of explanation the Internet is provided as an example of an external network. Any of the mentioned below networks can be associated with other external networks.

For brevity of explanation the various examples listed below refer to traffic that is sent from the RAN towards the Internet although any of the examples provided below are applicable to traffic that is sent from the Internet towards the RAN. Thus, a policy shaper can enforce a policy on information packets that are directed to the Internet and can enforce policy on information packets that are directed towards the RAN. The policy enforcer can generate a signature and send the signature to a probe and can also receive a signature generated by the probe.

The suggested systems, methods and computer readable mediums allow to apply policies (such as bandwidth allocation policies, rate shaping) on information packets while applying load balancing by a redundant policy enforcer.

Figure 2:
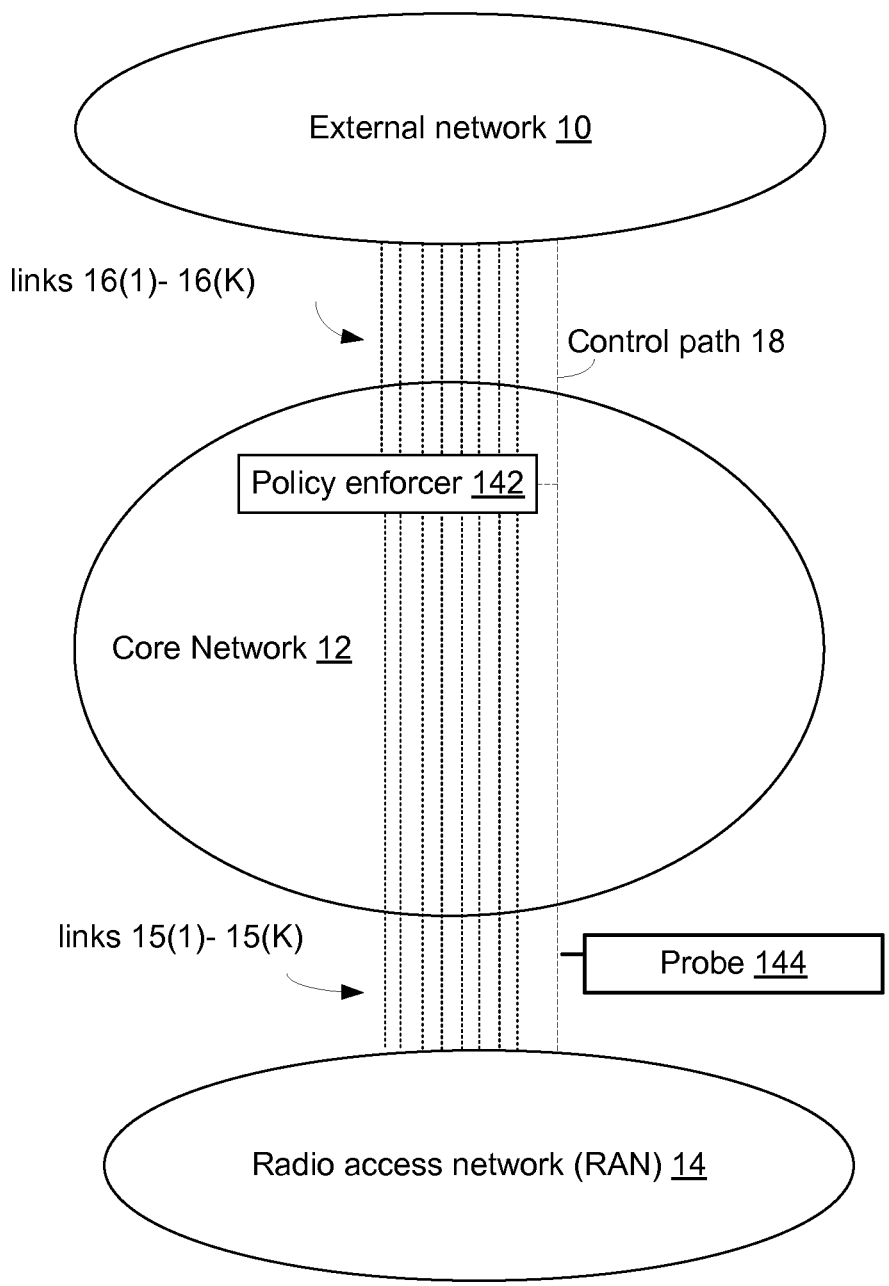
FIGS. 2-3 illustrates a probe, a policy enforcer and their environment according to various embodiments of the invention.

FIG. 2 illustrates a policy enforcer 142 and its environment according to an embodiment of the invention.

The policy enforcer 142 is illustrated as belonging to a core network 12. The core network 12 is coupled between an external network 10 and a radio access network (RAN) 14.

FIG. 2 illustrates multiple links 16(1)-16(K) between the policy enforcer 142 and the external network 10 and multiple links between the policy enforcer 142 and the RAN 14. At the absence of the policy enforcer 142 each link 16(k) would have been connected to link 15(k), wherein index k ranges between 1 and K. Thus, the policy enforcer 142 does not change the relationships between links 15(1)-15(K) and 16(1)-16(K) and can be logically viewed as a "bump" on these links.

FIG. 2 also illustrates a control path 18 that is connected to a probe 144 and to the policy enforcer 142. The probe 144 is located between the core network 12 and the RAN 14. The probe 144 can intercept control plane messages and send control metadata relating to the intercepted control plane massages to the policy enforcer 142.

Figure 3:
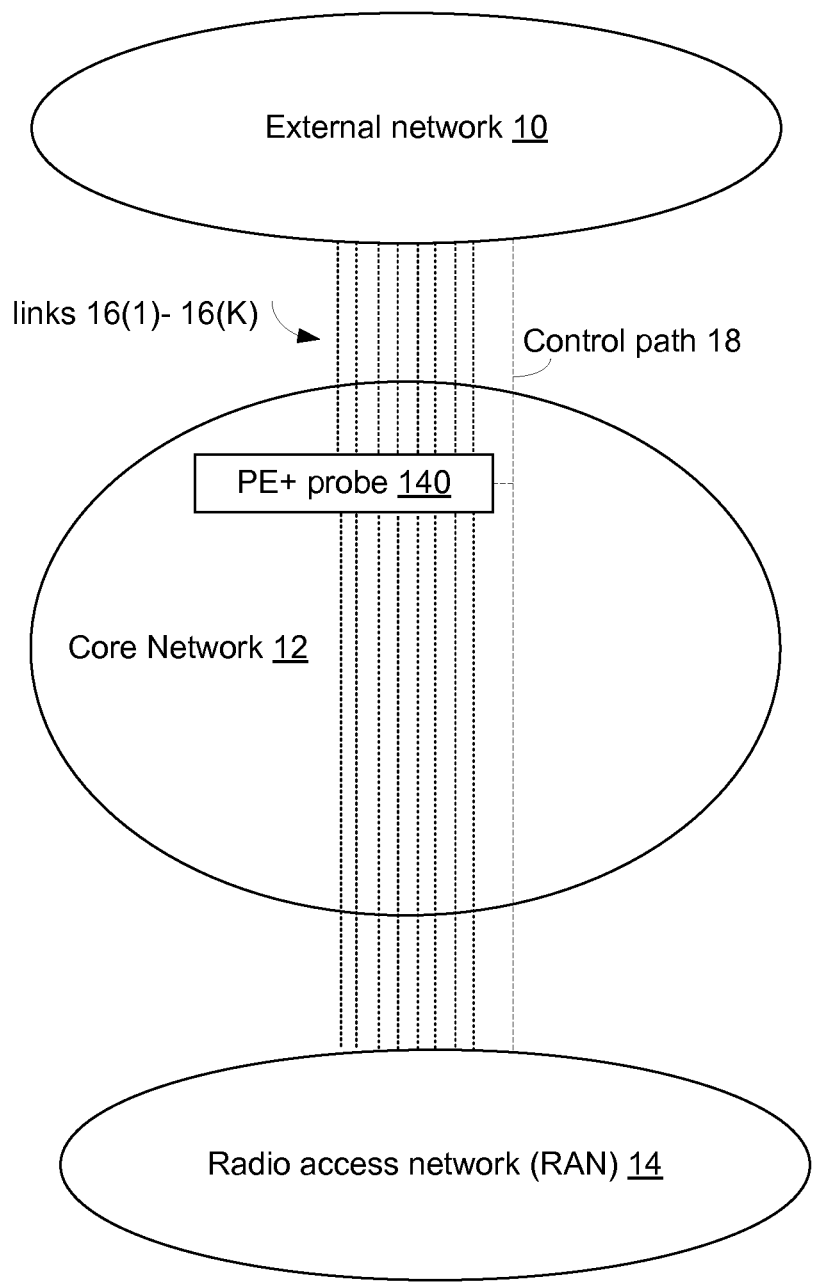

FIG. 3 illustrates the probe and the policy enforcer as being integrated together to provide a probing and policy enforcing entity 140.

It is noted that the probe 144 and the policy enforcer 142 can be located in various locations, that the policy enforcer 142 may not belong to the core network 12, that the probe 144 may belong to the core network 12 and that the probe 144 and the policy enforcer 142 can be separated form each other but proximate to each other.

It is noted that the policy enforcer 142 can intercept control plane messages and can, additionally or alternatively receive from the probe 144 control plane messages and process them to provide an indication about a status of the RAN.

Figure 4:
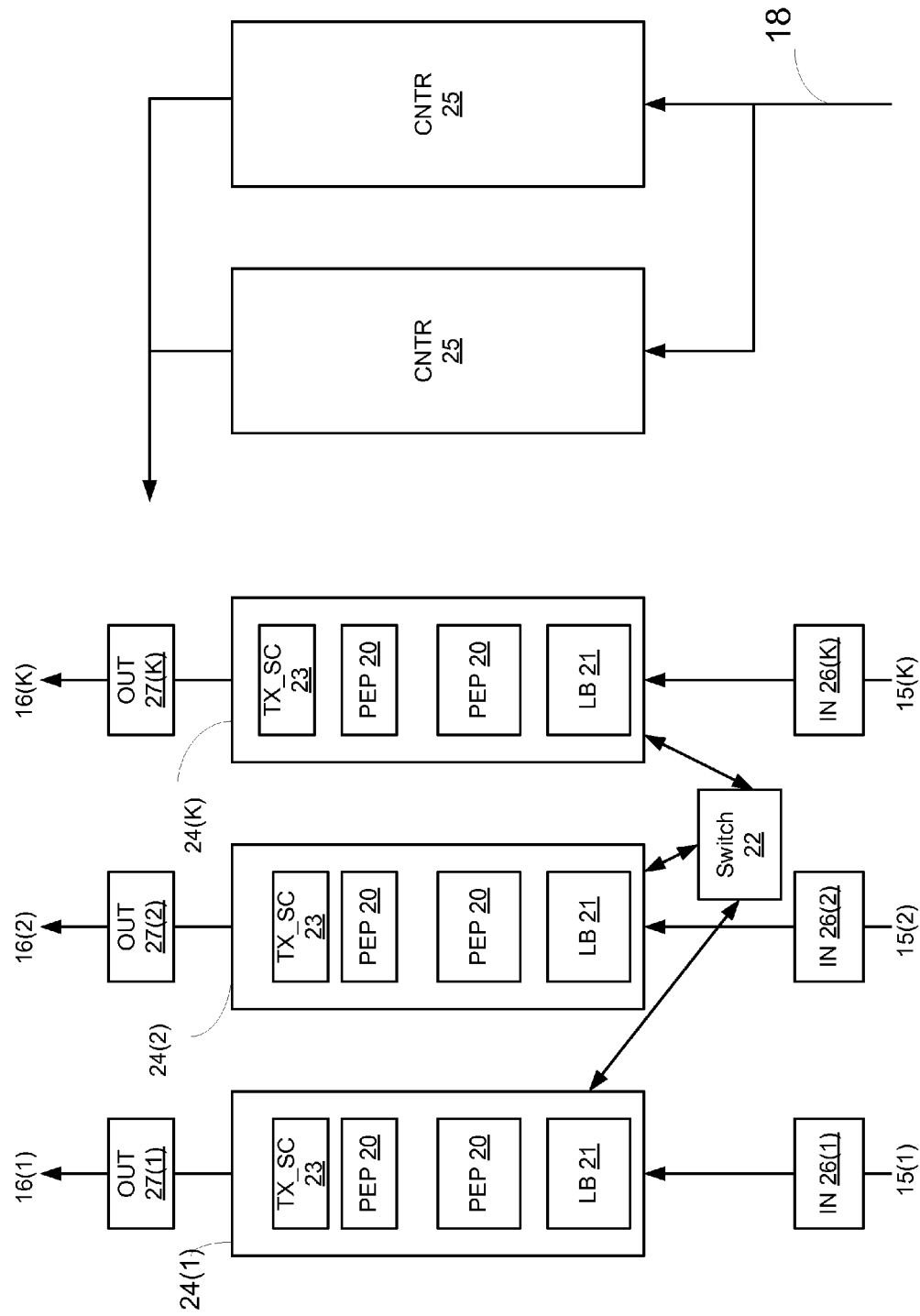
FIGS. 4-6 and 7A-7B illustrate policy enforcers according to various embodiments of the invention.

FIG. 4 illustrates a policy enforcer 142 having load balancing capabilities, according to an embodiment of the invention.

The policy enforcer 142 includes:
1. multiple pairs of interfaces (IN 26(1), OUT 27(1))-(IN 26(K), OUT 27(K)), each pair of interfaces includes an input interface and a corresponding output interface;
2. multiple data blades 24(1)-24(K), each may include zero or more policy enforcing processors (PEP) 20;
3. a switch 22;
4. at least one load balancing circuit LB 21; and
5. control blades CNTR 25.

The policy enforcer 142 can be located within a rack or a chassis.

FIG. 1 illustrates three PEPs 20 per each data blade. The number of PEPs per data blade may differ from three. The number of PEPs per data blade may be the same for all the data blades but may differ from one data blade to the other.

Figure 5:
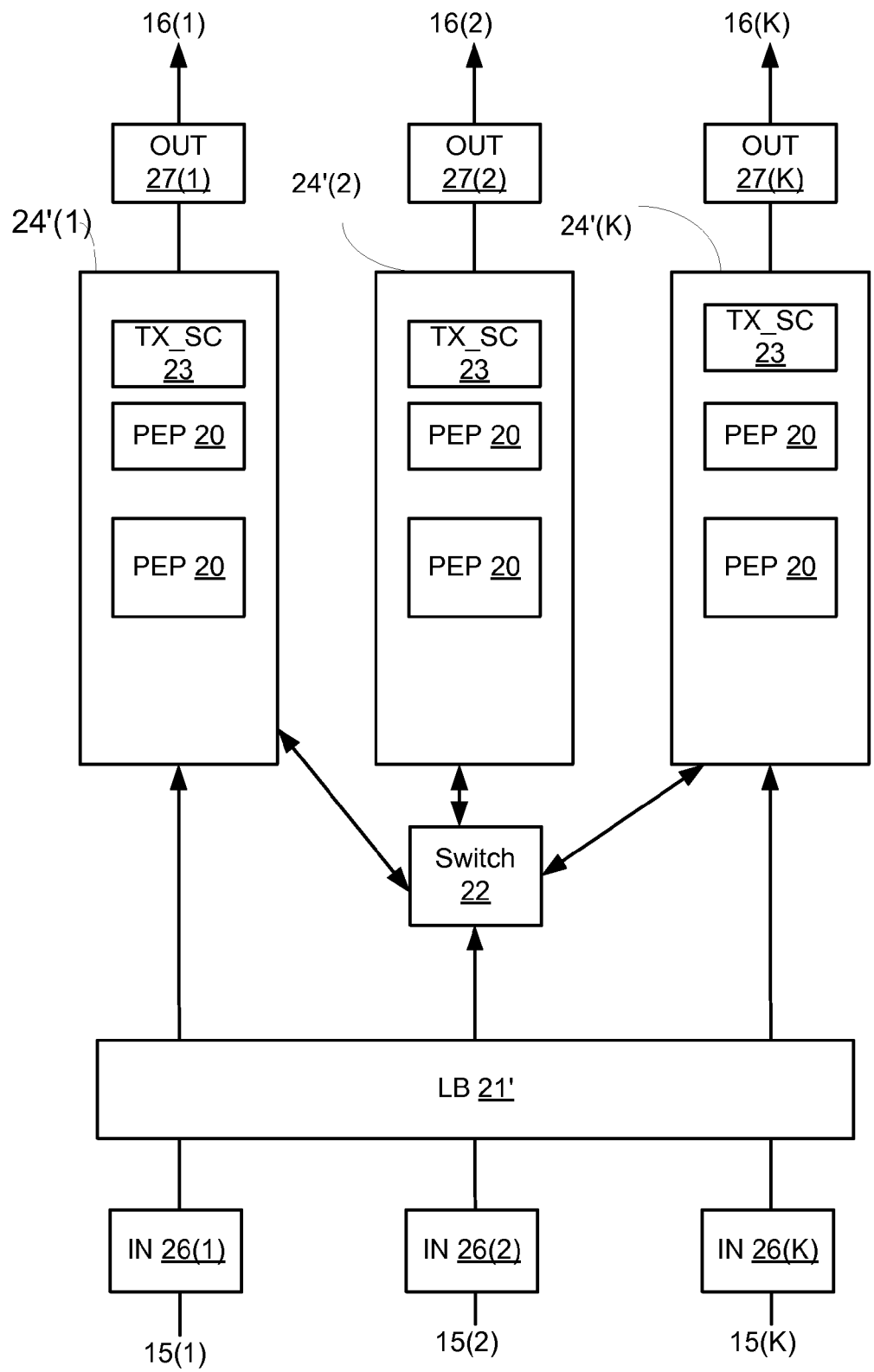
Figure 6:
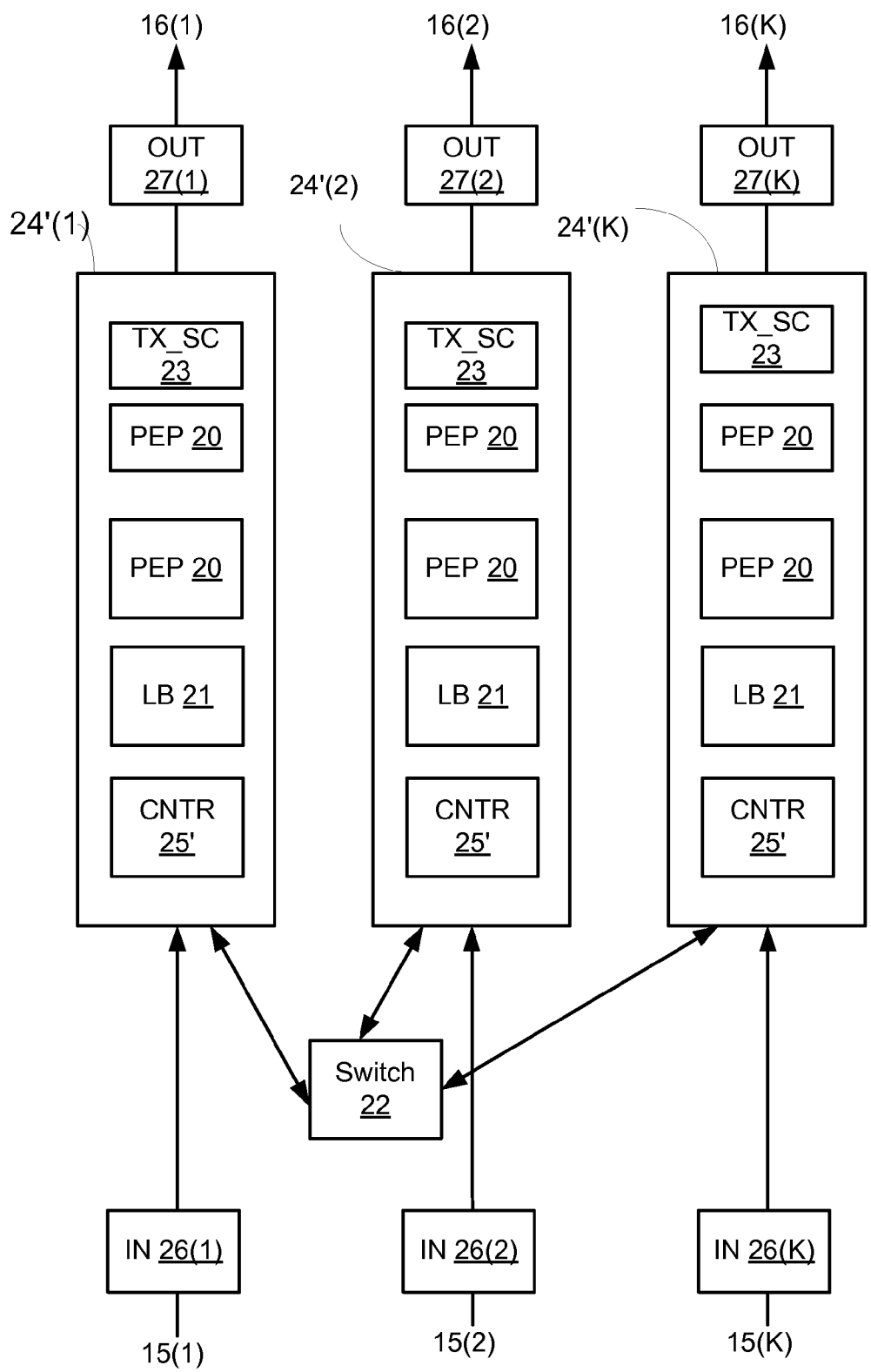

Each pair of interfaces ((IN 26($k$), OUT 27($k$)) is located along a path between the RAN 14 and an external network 10 through which information packets should have propagated at an absence of the policy enforcer 142. If, IN 26($k$) is connected to link 15($k$) then OUT 27($k$) is connected to link 27($k$). It is noted that the links can be bi-directional but for simplicity of explanation FIGS. 4-6 illustrate uni-directional links.

Each input interface IN 26($k$) may be arranged to receive a plurality of information packets that are associated with a plurality of user devices. An information packet can be associated with a user device if that user device is either a target of the information packer or a source of that information packet.

The at least one load balancing circuit LB 21 may be arranged to select, for each information packet, a selected policy enforcing processor out of multiple policy enforcing processors that belong to the multiple data blades 24(1)-24(K).

The at least one load balancing circuit LB 21 may be arranged to select in response to an allocation of policy enforcing processors to user devices and to a user device associated with each information packet.

The at least one load balancing circuit LB 21 may be arranged to send each information packet over the switch 22 to the selected policy enforcing processor associated with the information packet.

Each selected policy enforcing processor PEP 20 may be arranged to perform a policy enforcing operation on each information packet associated with the selected policy enforcing processor, to provide a policy enforced information packet. This policy enforcing operation may include compression, dropping, queuing, changing a timing of transmission, statistical multiplexing, duplicating and doing nothing.

The data blades are arranged to send, through the switch 22, each policy enforced information packet to an appropriate output interface—the output interface of the policy enforcer that belongs to a pair of interfaces that also includes the input interface from which an information packet was received before being converted to the policy enforced information packet. Thus, if the information packet was received by the first input interface IN 27(1) then the corresponding policy enforced information packet should be sent to the first output interface OUT 27(1).

Each output interface 27($k$) may be arranged to output each policy enforced information packet received by the output interface.

The policy enforcer 142 may have at least one control blade such as control blades CNTR 25 of FIG. 4.

The at least one control blade can be arranged to:
1. Receive control metadata that is indicative of at least one control plane message that was exchanged between the RAN and the core network;
2. Generate RAN status information based on the control metadata; and
3. Distribute the RAN status information to the multiple data blades and to the at least one load balancing circuit.

Each policy enforcing processor PEP 20 may be arranged to perform, on each information packet, the policy enforcement operation in response to the RAN status information.

FIG. 3 illustrates two control blades 25. One control blade may act as a control blade while the other may be kept as a backup control blade.

The policy enforcer 142 can switch between the control blades if a currently utilized control blade malfunctions. The backup control blade may be arranged to track a state of the control blade and to act as a control blade if the state of the control blade is inactive.

The policy enforcer 142 can apply a data blade redundancy scheme. It may check a functionality of the multiple data blades. The at least one load balancing circuit LB 21 may be arranged to match the allocation of policy enforcing processors to the functionality of the data blades. Thus, the data blades may detect an absence of response from one of the data blades and may change the allocation of PEPs 20 such as to avoid using PEP s of an inactive data blade. The tracking can be executed by the control blades, by the data blades or by both.

The functionality of a data blade or a control blade can be evaluated by tracking a response of that blade to messages such as keep alive messages.

It is noted that although FIG. 4 illustrates the input and output interfaces as not belonging to the data blades but that at least one of the data blades may include an input interface, an output interface or both.

For example, the policy enforcer 142 may include at least one data blade that includes at least PEP 20 and is without an interface of the multiple output and input interfaces.

According to an embodiment of the invention the policy enforcer 142 can include an interfacing blade that may include at least one interface of the multiple input and output interfaces and does not include any policy enforcing processor.

FIG. 4 illustrates data blades 24(1)-24(K) as including load balancing circuits LB 21. It is noted that the policy enforcer 142 can include at least one load balancing blade that does not include any policy enforcing processor. FIG. 5 illustrates a load balancing blade 21' that is connected to the switch 22 and to the input interfaces 16(1)-16(K) and also illustrates data blades 24'(1)-24'(K) that do not include load balancing circuits LB 21 as those illustrated in FIG. 4.

FIG. 6 illustrates a policy enforcer 142 according to another embodiment of the invention.

In this policy enforcer 142 the blades function as data blades and also as control blades. FIG. 6 illustrates control circuits CNTR 25' that are included in each of the data blades 24"(1)-24"(K). These control circuits can replace the control blades of FIG. 4.

Figure 7:
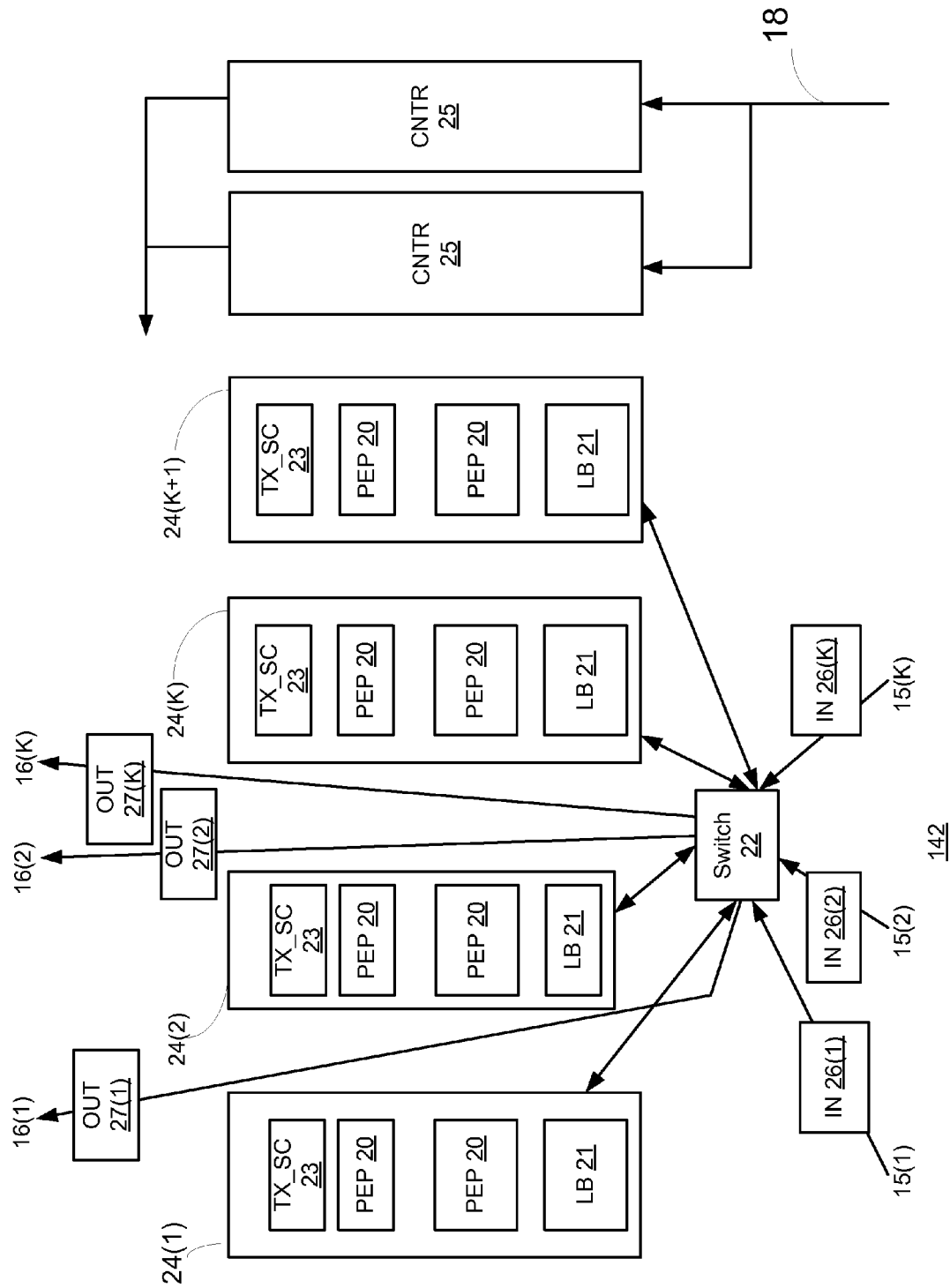
Figure 7B:
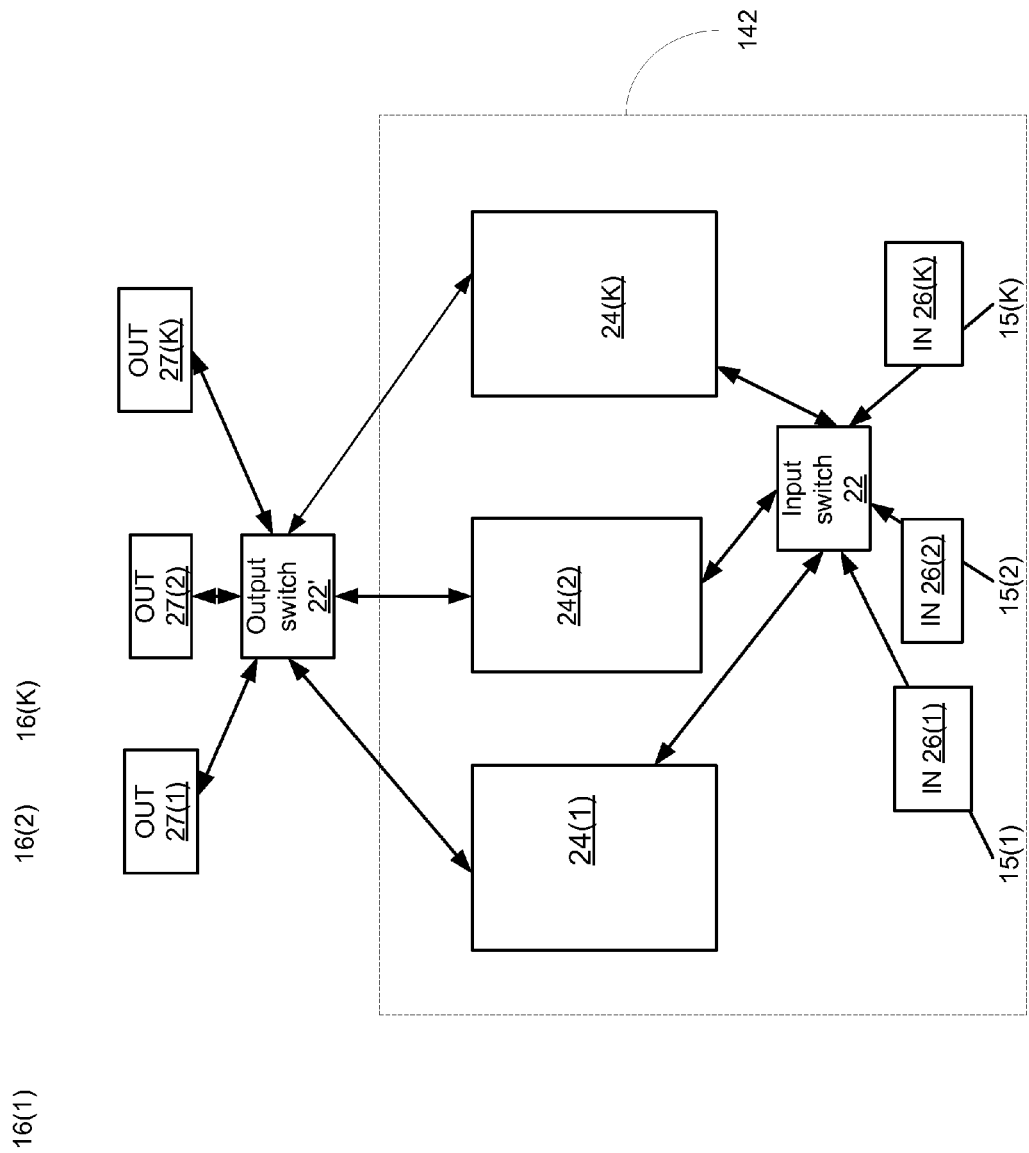

FIG. 7A illustrates a policy enforcer 142 according to another embodiment of the invention. In this policy enforcer the input and output interfaces 26(1)-26(K) and 27(1)-27(K) are not connected to the data blades but are connected to the switch 22. In addition, FIG. 7 illustrates a backup data blade 24(K+1) that can replace a malfunctioning data blade. It is noted that more than a single backup data blade can be provided.

According to various embodiments of the invention only a single policy enforcing processor PEP 20 is allocated for all information packets associated with a single cell of the RAN or even with multiple cells of the RAN.

According to an embodiment of the invention the output interfaces and an additional switch can be coupled to the policy enforcer 142 and not form a part of the policy enforcer. Thus, the data blades of the policy enforcer 142 can be coupled to a second switch that does not belong to the policy enforcer. The second switch can be connected to output interfaces that may virtually form pairs of interfaces with the input interfaces of the policy enforcer 142. The same can be applied to the input interfaces—they may be coupled to PE 142 instead being a part of it.

FIG. 7A illustrates a policy enforcer 142 according to an embodiment of the invention. The PE 142 may include input interfaces 26(1)-26(K), input switch 22 and data blades 24(1)-24(K) that are connected to each other. The data blades 24(1)-24(K) output data packets to output switch 22' that in turn is connected to output interfaces 27(!)-27(K).

Figure 8:
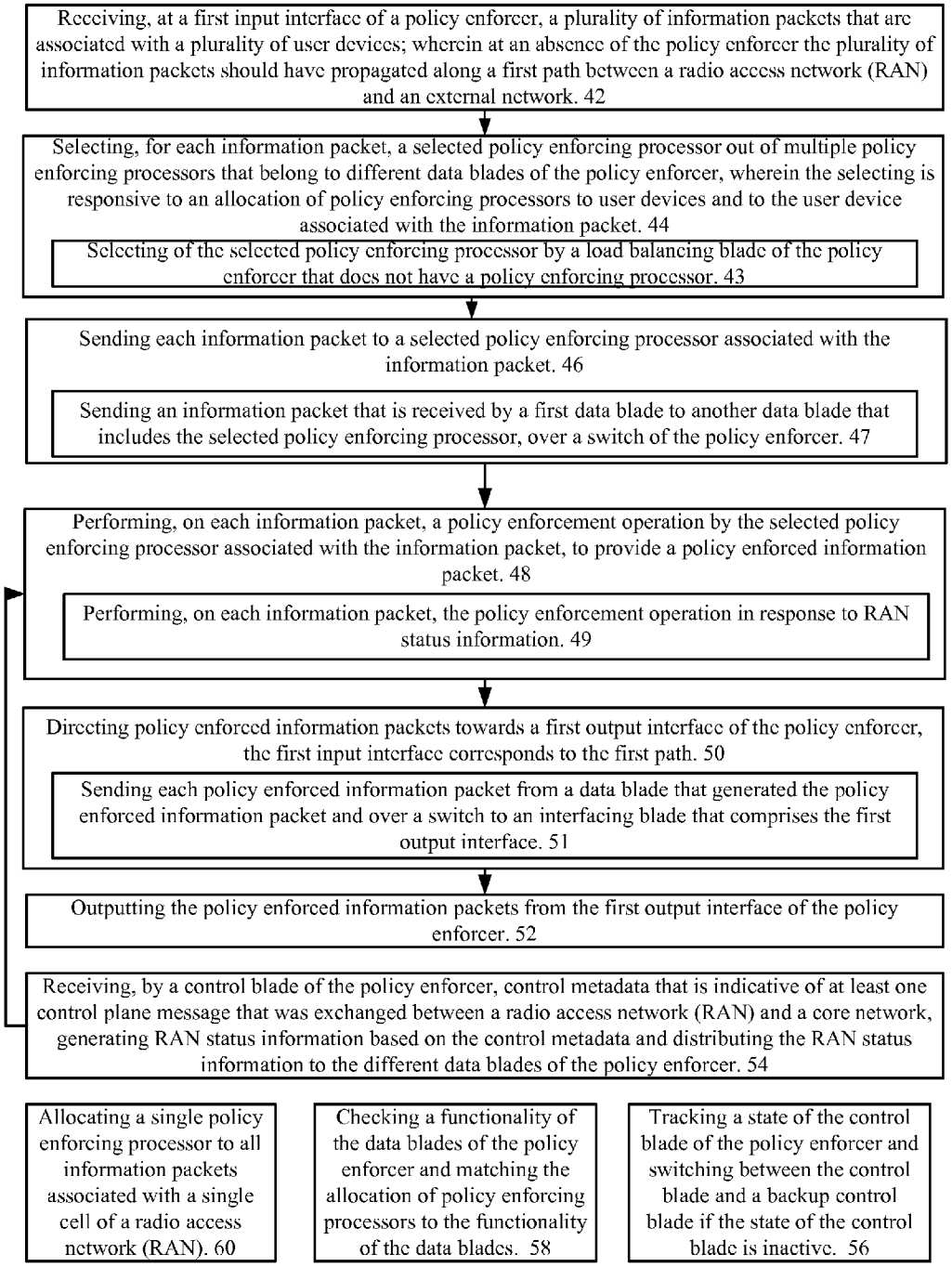
FIG. 8 illustrates a method according to an embodiment of the invention.

FIG. 8 illustrates method 40 according to an embodiment of the invention.

For simplicity of explanation the following method will refer to a first input interface and a first output interface of a policy enforcer. The policy enforcer has multiple pairs of input and output interfaces and the method is applied on each pair of corresponding input and output interfaces.

Method 400 can start by stage 42 of receiving, at a first input interface of a policy enforcer, a plurality of information packets that are associated with a plurality of user devices. At the absence of the policy enforcer the plurality of information packets should have propagated along a first path between a radio access network (RAN) and an external network.

Stage 42 may be followed by stage 44 of selecting, for each information packet, a selected policy enforcing processor out of multiple policy enforcing processors that belong to different data blades of the policy enforcer. The selecting may be responsive to an allocation of policy enforcing processors to user devices and to the user device associated with the information packet.

Stage 44 may include stage 43 of selecting of the selected policy enforcing processor by a load balancing blade of the policy enforcer that does not have a policy enforcing processor.

Stage 44 may be followed by stage 46 of sending each information packet to a selected policy enforcing processor associated with the information packet.

Stage 46 may include stage 47 of sending an information packet that is received by a first data blade to another data blade that includes the selected policy enforcing processor, over a switch of the policy enforcer.

If, for example, the selected policy enforcing processor belongs to the first data blade then the sending includes sending the information packet within the first data blade.

Stage 46 is followed by stage 48 of performing, on each information packet, a policy enforcement operation by the selected policy enforcing processor associated with the information packet, to provide a policy enforced information packet.

Method 40 may include stage 54 of receiving, by a control blade of the policy enforcer, control metadata that is indicative of at least one control plane message that was exchanged between a radio access network (RAN) and a core network, generating RAN status information based on the control metadata and distributing the RAN status information to the different data blades of the policy enforcer.

Stages 46 and 54 may be followed by stage 48. Stage 48 may include stage 49 of performing, on each information packet, the policy enforcement operation in response to RAN status information.

Stage 48 may be followed by stage 50 of directing policy enforced information packets towards a first output interface of the policy enforcer, the first input interface corresponds to the first path.

Stage 50 may include stage 51 of sending each policy enforced information packet from a data blade that generated the policy enforced information packet and over a switch to an interfacing blade that comprises the first output interface.

Stage 50 may be followed by stage 52 of outputting the policy enforced information packets from the first output interface of the policy enforcer.

Method 40 can also include at least one stage of stages 56, 58 and 60.

Stage 56 may include tracking a state of the control blade of the policy enforcer and switching between the control blade and a backup control blade if the state of the control blade is inactive.

Stage 58 may include checking a functionality of the data blades of the policy enforcer and matching the allocation of policy enforcing processors to the functionality of the data blades.

Stage 60 may include allocating a single policy enforcing processor to all information packets associated with a single cell of a radio access network (RAN). It is noted that a PEP can manage all traffic associated with multiple cells, with a unique portion of a cell, with certain user devices and the like. Yet according to an embodiment of the invention the allocation per data blade is based upon the identity of user device or cells of the RAN.

FIGS. 9-12 illustrates a policy enforcer and a probe as well as their environment according to an embodiment of the invention at the presence of a network address translator NAT.

According to an embodiment of the invention the probe and the policy enforcer are logically located at different sides of a NAT—the address information the probe sees differs from the address information that the policy enforcer sees as a result of an appliance of a NAT process on the information address.

The probe 144 can intercept control plane messages that relate to entities of the RAN or to entities that are coupled to the RAN. The probe 144 can generate a signature that is sent to the policy enforcer. It is expected that data plane messages (information packets) that are sent from these entities will include that signature.

The signature is designed such as to withstand the NAT process—not to be changed during the NAT process or to be changed in a manner that does not effect the detection of the signature.

The signature can include predefined information packet fields or a result of a processing operation (such as hash) applied on these predefined information packet fields.

The signature can be associated with a lifespan in order to reduce the probability that two information packets related to different entities will have the same signature. Non-limiting examples of a lifespan can include one or few seconds.

The signature can be responsive to UDP checksum field, TCP checksum field, IP destination address, IP source address, payload portions and the like.

The selection of fields is made in response to the NAT process- to make sure that the signature does not change due to the NAT process.

The policy enforcer can enforce a policy on information packets that are identified by their signature based on the policy rules and the status of the RAN (or any information included in the control metadata).

Figure 9:
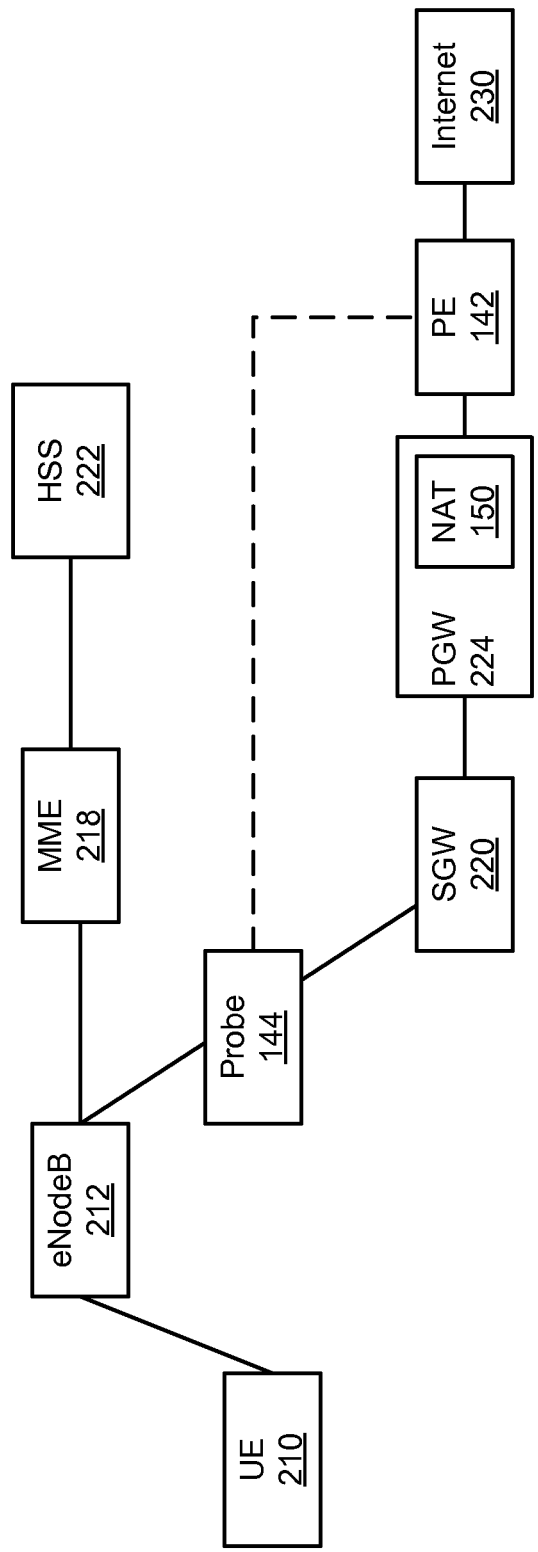
FIGS. 9-15 illustrate a probe, a policy enforcer and their environment according to various embodiments of the invention.

FIG. 9 illustrates probe 144 as being positioned between the eNodeB 212 and the GSW 220.

The probe 144 can be coupled to between any of the following entities: eNodeB and UE 210, eNodeB and MME 218, SGW 20 and PGW 220. The PGW 200 includes NAT 150.

The probe 144 can be placed closer to either the core network nodes like the MME 218 and the SGW 220 or closer to the eNodeB 212. Additionally, the probe can be implemented within these devices.

The probe 144 parses the S1 messages between the eNodeB 212 and the core network. This includes S1-AP messages between the MME 218 and the eNodeB 212, and the NAS signaling messages between the MME 218 and the UE 210.

The UE 210 is also sometimes called the Mobile Station (MS). It can be any device (including cell phones, laptop modems) that can attach to a 3G or a 4G network.

Figure 10:
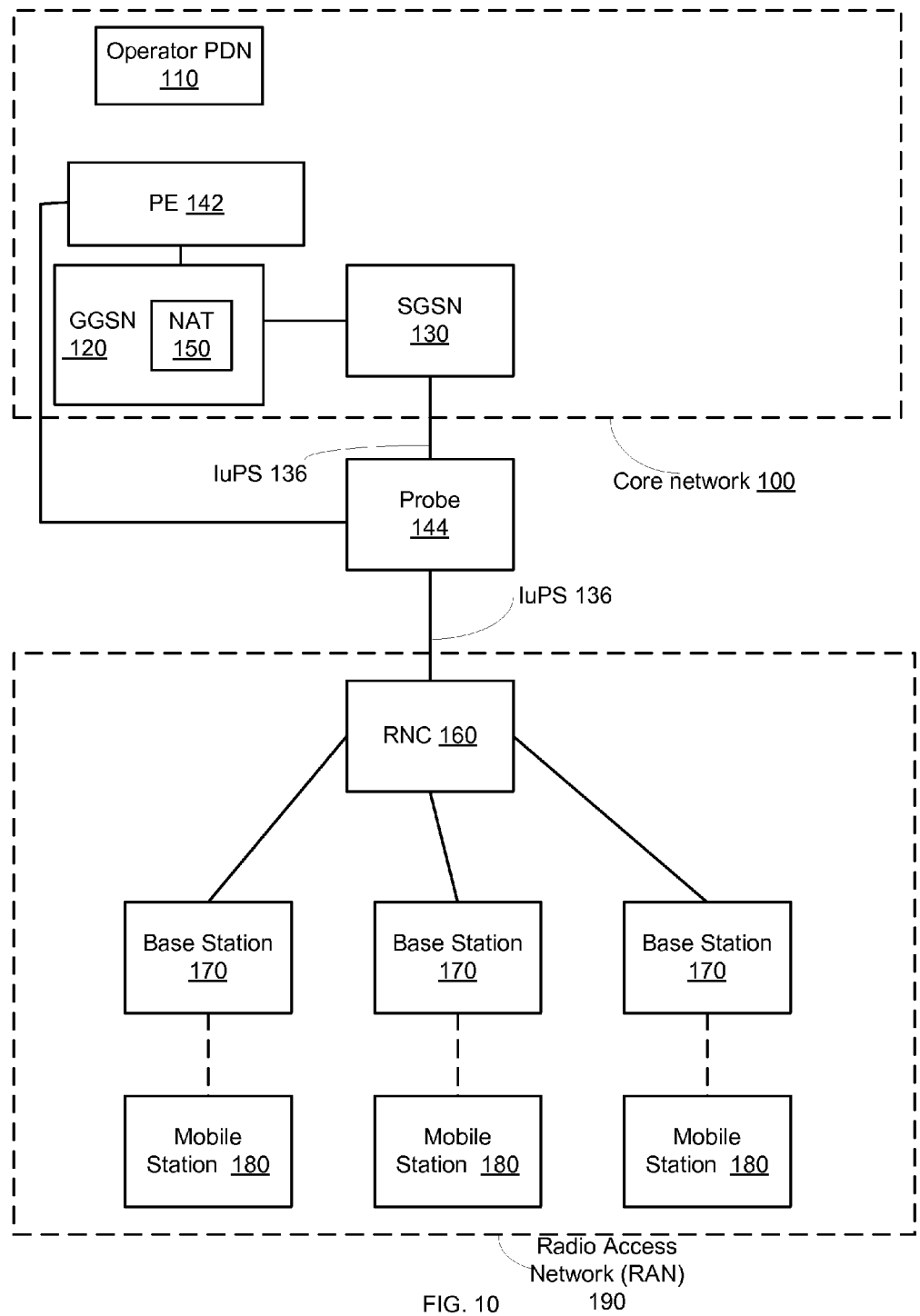

FIG. 10 illustrates policy enforcer (PE) 142, a probe 144, a core network 100 and RAN 190 according to an embodiment of the invention.

The probe 144 may intercept control plane messages.

The PE 142 may process control metadata from the probe and apply a policy on information packets based on their signatures. The PE 142 may also evaluate to state of the RAN.

The probe 144 is illustrated as being coupled to IuPS 136 interfaces.

It is noted that the probe 144 may also track after user data sessions and that PE 142 can also perform various operations in response to the state of the RAN, such as congestion estimation, congestion prevention, and the like.

The PE 142 may enforce bandwidth management decisions it makes. For example, the PE 142 can model the RAN, and in response to the model it can allocate a target bit rate for each application session. The PE 142 then tries to enforce the bit rate for the application session using various techniques. The technique used depends on the type of application session. The PE 142 may control the bit rate on both directions—uplink and downlink. Thus, a stream that is intended to be provided from the core network to the RAN can be compressed, delayed, statistically multiplexed with other streams before it passes towards the RAN. The same applies to streams that are sent from the RAN to the core network.

Additionally or alternatively, the PE 142 can send bit rate allocation values to entities of the core network and/or to entities of the RAN and request these entities to enforce these bit rate allocation values.

The core network 100 is illustrated as including an operator PDN 110 such as the Internet or a private packet data network, GGSN 120 and SGSN 130. The GGSN 120 is coupled between the operator PDN 110 and the SGSN 130.

The RAN 190 includes a RNC 160 that is coupled to multiple base stations 170 that in turn are wirelessly coupled to mobile stations 180.

The probe 144 can be placed closer to either the SGSN 130 or the RNC 160. There is no restriction on its physical placement. Additionally, the functions of the probe 144 can be implemented within the SGSN 130 or the RNC 160.

In the case of 4G networks, the probe 144 can be placed between the eNodeB, the MME/SGW (Serving Gateway).

According to such an embodiment of the invention, the probe 144 may perform part of the processing of the control plane messages, may assist in enforcing a policy, and may assist a modeling of the RAN. The probe 144 can even sent to the PE 142 instructions relating to an enforcement of policy—such as policy enforcing parameters, which policy to enforce and the like.

The probe 144 can parse all signaling messages between the RAN 190 and the core network and provides a summary of the RAN conditions to the PE 142. It is also possible for the probe 144 to just forward a copy of all control plane messages to the PE 142. In this case, the control plane messages are actually processed on the PE 142 to enforce policies and additionally or alternatively to model the RAN 190 and the probe 144 does not process these messages. In case of 4G networks, the PE 142 can be placed on the SGi interface between the PGW and the operator services/Internet with the probe 144 on the S1 interface.

When the probe 144 is placed on the interface between the RAN and the core network, it can be placed either close to the core network nodes like the SGSN, SGW or MME or closer to the RAN network. It can also be placed inside the RAN network between the base stations and the RNC.

Figure 11:
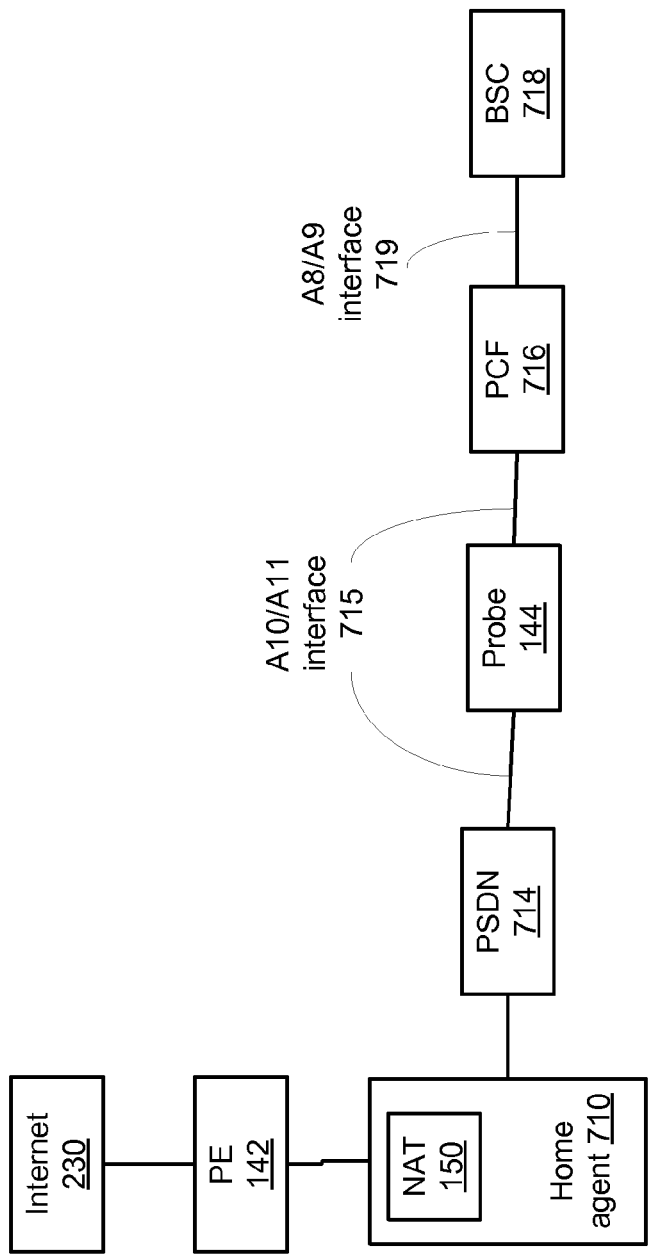

FIG. 11 illustrates the PE 142 and the probe 144 142 in various CDMA 3G networks, according to various embodiments of the invention.

The CDMA 3G network includes a Base Station Controller (BSC) 718, a Packet Control Function (PCF) 716, a Packet Data Serving Node (PDSN) 714 and a home agent 710. The NAT 150 is located at the home agent 710. The PE 142 is coupled between the home agent 710 and the Internet 230.

The probe 144 can be placed on the A10/A11 interface between the PCF 716 and the PDSN 714. The probe 144 may parse all the A11 control plane messages exchanged between the PCF 716 and the PDSN 714 to model the RAN that includes the BSC 718 and the base stations controlled by the BSC.

It is noted that the probe can be placed on the A8/A9 interface between the BSC 718 and the PCF 716. The probe may parse the A9 control plane messages exchanged between the BSC 718 and the PCF 716.

FIGS. 12-15 illustrate a policy enforcer and a probe that are either integrated or located in proximity to each other and their environments according to various embodiments of the invention.

Figure 12:
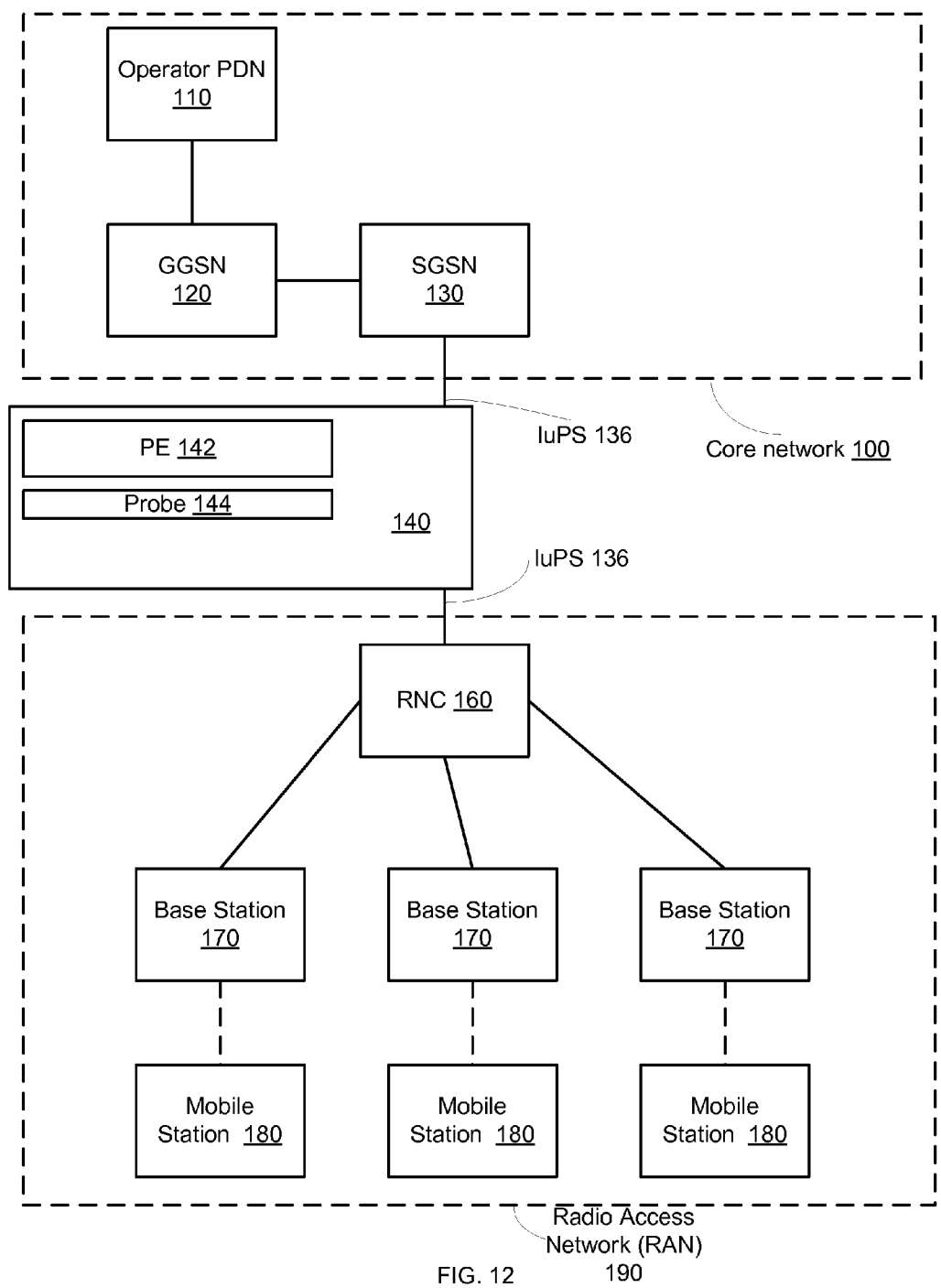

FIG. 12 a combination of a probe 144 and a PE 142 that provide probing and policy enforcing entity 140.

The probing and policy enforcing entity 140 is positioned between the SGSN 130 and the RNC 160.

Figure 13:
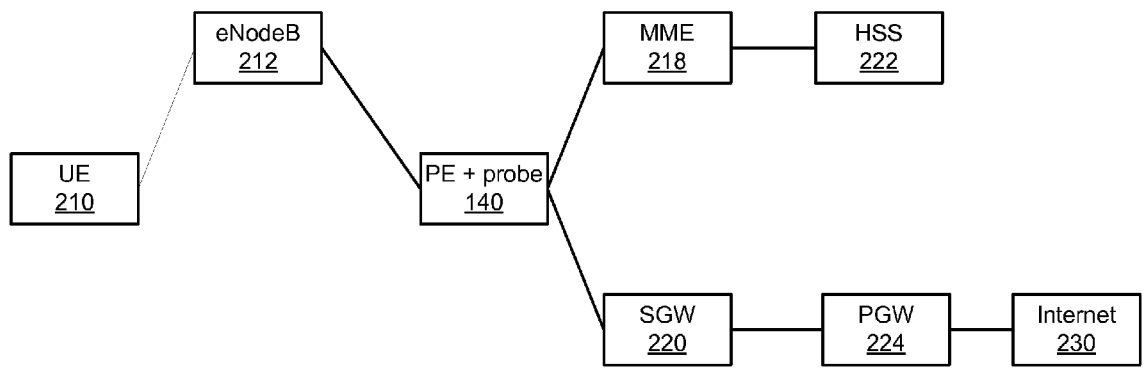

FIG. 13 illustrates a probing and policy enforcing entity 140 located between the eNodeB 212 the MME 218 and SGW 220. The probing and policy enforcing entity 140 may parse all S1 messages between the eNodeB 212 and the core network (Internet 230). This includes S1-AP messages between the MME 218 and the eNodeB 212, and the NAS signaling messages between the MME 218 and the UE 210.

The probing and policy enforcing entity 140 can be placed closer to either the core network nodes like the MME 218 and the SGW 220 or closer to the eNodeB 212. Additionally, the probing and policy enforcing entity 140 can be implemented within these devices.

Figure 14:
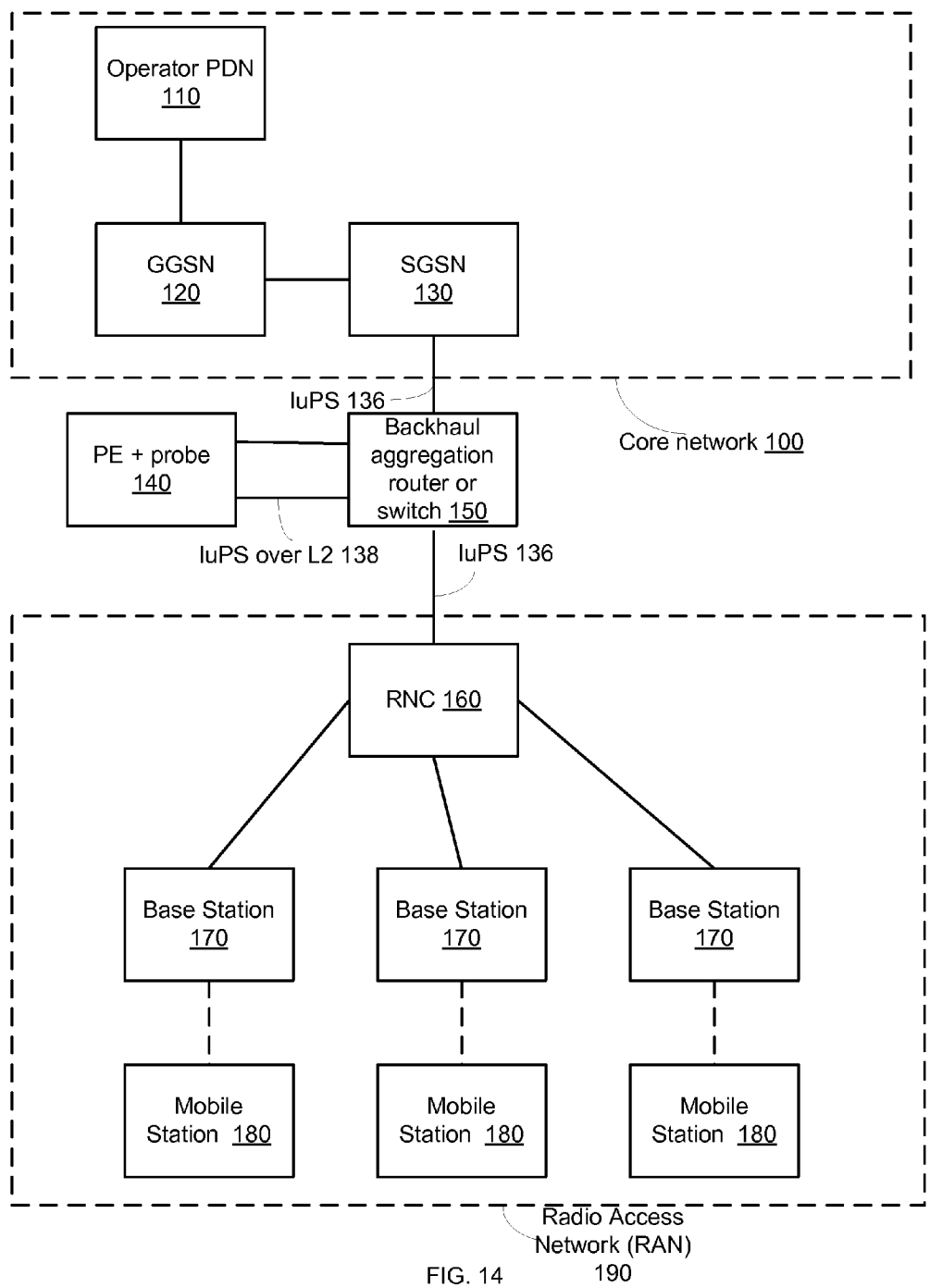

It is also possible to place the probing and policy enforcing entity 140 in an out-of-path mode, where the probing and policy enforcing entity 140 is co-located with an aggregation router/switch on the backhaul link. The aggregation router is configured to send specific packets (or in some cases all packets) to the probing and policy enforcing entity 140. Once the probing and policy enforcing entity 140 is done with parsing the messages, they are sent back to the aggregation router and from there to the original destination. The out-of-path approach has an advantage that if the EBM fails, it does not cause any impact to the rest of the network. An out-of-path approach in a 3G wireless network is shown in FIG. 14. A backhaul aggregator router or switch 150 is coupled between the SGSN 130 and the RNC 160 (instead of the EBM 140 being coupled between these elements) and having the probing and policy enforcing entity 140 coupled to the backhaul aggregator router or switch 150.

The out-of-path approach can also be achieved using an Optical Bypass Switch or Network Tap. The out-of-path configuration can also be applied to the 4G wireless network.

Figure 15:
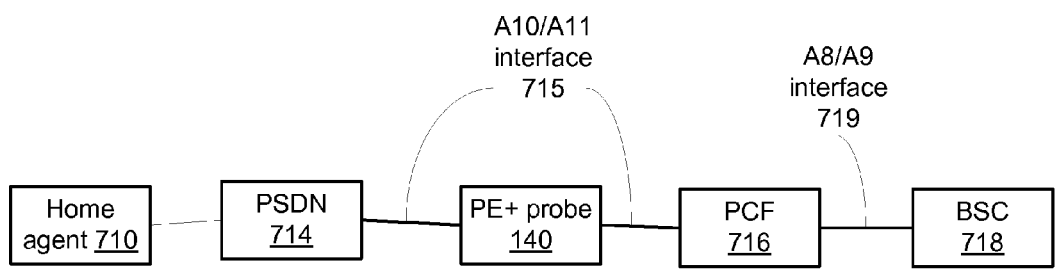

FIG. 15 illustrates probing and policy enforcing entity 140 in a CDMA 3G network, according to an embodiment of the invention. The CDMA 3G network includes a Base Station Controller (BSC) 718, a Packet Control Function (PCF) 716, a Packet Data Serving Node (PDSN) 714 and a home agent 710.

FIG. 7 illustrates the probing and policy enforcing entity 140 as being placed on the A10/A11 interface between the PCF 716 and the PDSN 714. The probing and policy enforcing entity 140 may parse all the A11 control plane messages exchanged between the PCF 716 and the PDSN 714 to model the RAN that includes the BSC 718 and the base stations controlled by the BSC.

The probing and policy enforcing entity 140 may be being placed on the A8/A9 interface between the BSC 718 and the PCF 716. The probing and policy enforcing entity 140 may parse the A9 control plane messages exchanged between the BSC 718 and the PCF 716.

According to an embodiment of the invention a computer readable medium is provided. The computer readable medium is non-transitory and may store instructions for executing any of the mentioned above methods.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A policy enforcer having load balancing capabilities, the policy enforcer comprises:
multiple pairs of interfaces, each pair of interfaces comprises an input interface and a corresponding output interface;
multiple data blades;
a switch; and
at least one load balancing circuit;
wherein each pair of interfaces is located along a path between a radio access network (RAN) and an external network through which information packets should have propagated at an absence of the policy enforcer;
wherein each input interface is arranged to receive a plurality of information packets that are associated with a plurality of user devices;
wherein the at least one load balancing circuit is arranged to select, for each information packet, a selected policy enforcing processor out of multiple policy enforcing processors that belong to the multiple data blades;
wherein the at least one load balancing circuit is arranged to select in response to an allocation of policy enforcing processors to user devices and to a user device associated with each information packet;
wherein the at least one load balancing circuit is arranged to send each information packet over the switch to the selected policy enforcing processor associated with the information packet;
wherein each selected policy enforcing processor is arranged to perform a policy enforcing operation on each information packet associated with the selected policy enforcing processor, to provide a policy enforced information packet;
wherein the switch is arranged to direct each policy enforced information packet to an output interface of the policy enforcer that belongs to a pair of interfaces that comprises the output interface and an input interface from which an information packet was received before being converted to the policy enforced information packet; and
wherein each output interface is arranged to output each policy enforced information packet received by the output interface.

2. The policy enforcer according to claim 1 further comprising at least one control blade that is arranged to receive control metadata that is indicative of at least one control plane message that was exchanged between the RAN and the core network; to generate RAN status information based on the control metadata; and to distribute the RAN status information to the multiple data blades and to the at least one load balancing circuit.

3. The policy enforcer according to claim 2, wherein each policy enforcing processor is arranged to perform, on each information packet, the policy enforcement operation in response to the RAN status information.

4. The policy enforcer according to claim 2, wherein the at least one control blade comprises a control blade and a backup control lade wherein the backup control blade is arranged to track a state of the control blade and to act as a control blade if the state of the control blade is inactive.

5. The policy enforcer according to claim 1, arranged to check a functionality of the multiple data blades and wherein the at least one load balancing circuit is arranged to match the allocation of policy enforcing processors to the functionality of the data blades.

6. The policy enforcer according to claim 1, comprising at least one data blade that comprises at least one policy enforcing processor and is without an interface of the multiple output and input interfaces.

7. The policy enforcer according to claim 1, comprising at least one interfacing blade that comprises at least one interface of the multiple input and output interfaces and does not comprise any policy enforcing processor.

8. The policy enforcer according to claim 1, wherein the at least one load balancing circuit comprises at least one load balancing blade that does not comprise any policy enforcing processor.

9. The policy enforcer according to claim 1, wherein only a single policy enforcing processor is allocated for all information packets associated with a single cell of the RAN.

10. A method for load balancing, the method comprising:
receiving, at a first input interface of a policy enforcer, a plurality of information packets that are associated with a plurality of user devices; wherein at an absence of the policy enforcer the plurality of information packets should have propagated along a first path between a radio access network (RAN) and an external network;

selecting, for each information packet, a selected policy enforcing processor out of multiple policy enforcing processors that belong to different data blades of the policy enforcer, wherein the selecting is responsive to an allocation of policy enforcing processors to user devices and to the user device associated with the information packet;

sending each information packet to a selected policy enforcing processor associated with the information packet;

performing, on each information packet, a policy enforcement operation by the selected policy enforcing processor associated with the information packet, to provide a policy enforced information packet;

directing policy enforced information packets towards a first output interface of the policy enforcer, the first input interface corresponds to the first path; and outputting the policy enforced information packets from the first output interface of the policy enforcer.

11. The method according to claim 10 comprising receiving, by a control blade of the policy enforcer, control metadata that is indicative of at least one control plane message that was exchanged between a radio access network (RAN) and a core network; generating RAN status information based on the control metadata; and distributing the RAN status information to the different data blades of the policy enforcer.

12. The method according to claim 11, comprising performing, on each information packet, the policy enforcement operation in response to the RAN status information.

13. The method according to claim 11, comprising tracking a state of the control blade of the policy enforcer and switching between the control blade and a backup control blade if the state of the control blade is inactive.

14. The method according to claim 10, comprising checking a functionality of the data blades of the policy enforcer and matching the allocation of policy enforcing processors to the functionality of the data blades.

15. The method according to claim 10, wherein the first input interface and the first output interface belong to a first data blade of the policy enforcer; wherein the method comprises sending each information packet that is associated with a selected policy enforcing processor that belongs to another data blade of the policy enforcer to the other data blade over a switch of the policy enforcer; and sending each policy enforced information packet from the other data blade to the first data blade.

16. The method according to claim 10, wherein the first input interface and the first output interface belong to an interfacing blade of the policy enforcer; wherein the method comprises sending, over a switch, each information packet that is associated with a selected policy enforcing processor to a data blade of the policy enforcer that comprises the selected policy enforcing processor; and sending each policy enforced information packet from a data blade and over the switch to the interfacing blade.

17. The method according to claim 10, comprising allocating a single policy enforcing processor to all information packets associated with a single cell of a radio access network (RAN).

18. The method according to claim 10, comprising selecting of the selected policy enforcing processor by a load balancing blade of the policy enforcer that does not have a policy enforcing processor.

19. A non-transitory computer readable medium that stores instructions which when executed performs the steps of:

receiving, at a first input interface of a policy enforcer, a plurality of information packets that are associated with a plurality of user devices; wherein at an absence of the policy enforcer the plurality of information packets should have propagated along a first path between a radio access network (RAN) and an external network;

selecting, for each information packet, a selected policy enforcing processor out of multiple policy enforcing processors that belong to different data blades of the policy enforcer, wherein the selecting is responsive to an allocation of policy enforcing processors to user devices and to the user device associated with the information packet;

sending each information packet to a selected policy enforcing processor associated with the information packet;

performing, on each information packet, a policy enforcement operation by the selected policy enforcing processor associated with the information packet, to provide a policy enforced information packet;

directing policy enforced information packets towards a first output interface of the policy enforcer, the first input interface corresponds to the first path; and outputting the policy enforced information packets from the first output interface of the policy enforcer.

20. The non-transitory computer readable medium according to claim 19, storing instructions for receiving, by a control blade of the policy enforcer, control metadata that is indicative of at least one control plane message that was exchanged between a radio access network (RAN) and a core network; generating RAN status information based on the control metadata; and distributing the RAN status information to the different data blades of the policy enforcer.

21. The non-transitory computer readable medium according to claim 19, storing instructions for performing, on each information packet, the policy enforcement operation in response to the RAN status information.

22. The non-transitory computer readable medium according to claim 19, storing instructions for tracking a state of the control blade of the policy enforcer and switching between the control blade and a backup control blade if the state of the control blade is inactive.

23. The non-transitory computer readable medium according to claim 19, storing instructions for checking a functionality of the data blades of the policy enforcer and matching the allocation of policy enforcing processors to the functionality of the data blades.

24. The non-transitory computer readable medium according to claim 19, wherein the first input interface and the first output interface belong to a first data blade of the policy enforcer; wherein the non-transitory computer readable medium stores instructions for sending each information packet that is associated with a selected policy enforcing processor that belongs to another data blade of the policy enforcer to the other data blade over a switch of the policy enforcer; and sending each policy enforced information packet from the other data blade to the first data blade.

25. The non-transitory computer readable medium according to claim 19, wherein the first input interface and the first output interface belong to an interfacing blade of the policy enforcer; wherein the non-transitory computer readable medium stores instructions for sending, over a switch, each information packet that is associated with a selected policy enforcing processor to a data blade of the policy enforcer that comprises the selected policy enforcing processor; and sending each policy enforced information packet from a data blade and over the switch to the interfacing blade.

26. The non-transitory computer readable medium according to claim 19, storing instructions for allocating a single policy enforcing processor to all information packets associated with a single cell of a radio access network (RAN).

27. The non-transitory computer readable medium according to claim 19, storing instructions for selecting of the selected policy enforcing processor by a load balancing blade of the policy enforcer that does not have a policy enforcing processor.

28. A policy enforcer having load balancing capabilities, the policy enforcer is coupled to multiple output interfaces; wherein the policy enforcer comprises:
multiple input interfaces; wherein the multiple input interfaces and the multiple output interfaces form pairs of interfaces;
multiple data blades;
a switch;
at least one load balancing circuit;
wherein each pair of interfaces is located along a path between a radio access network (RAN) and an external network through which information packets should have propagated at an absence of the policy enforcer;
wherein each input interface is arranged to receive a plurality of information packets that are associated with a plurality of user devices;
wherein the at least one load balancing circuit is arranged to select, for each information packet, a selected policy enforcing processor out of multiple policy enforcing processors that belong to the multiple data blades;
wherein the at least one load balancing circuit is arranged to select in response to an allocation of policy enforcing processors to user devices and to a user device associated with each information packet;
wherein the at least one load balancing circuit is arranged to send each information packet over the switch to the selected policy enforcing processor associated with the information packet;
wherein each selected policy enforcing processor is arranged to perform a policy enforcing operation on each information packet associated with the selected policy enforcing processor, to provide a policy enforced information packet;
wherein the switch is arranged to direct each policy enforced information packet to an output interface of the policy enforcer that belongs to a pair of interfaces that comprises the output interface and an input interface from which an information packet was received before being converted to the policy enforced information packet; and
wherein each output interface is arranged to output each policy enforced information packet received by the output interface.

* * * * *